United States Patent [19]

Kelsey, Jr. et al.

[11] 4,014,812

[45] Mar. 29, 1977

[54] METHOD OF PREPARING RARE EARTH PYROHAFNATE PHOSPHORS

[75] Inventors: Paul V. Kelsey, Jr., Blacksburg, Va.; James E. Mathers, Ulster, Pa.

[73] Assignee: GTE Sylvania Incorporated, Stamford, Conn.

[22] Filed: May 19, 1975

[21] Appl. No.: 578,763

Related U.S. Application Data

[62] Division of Ser. No. 509,286, Sept. 25, 1975, abandoned.

[52] U.S. Cl. .......................................... 252/301.4 F
[51] Int. Cl.$^2$ .......................................... C09K 11/46
[58] Field of Search ............... 252/301.4 F, 301.4 R

[56] References Cited

UNITED STATES PATENTS

| | | | |
|---|---|---|---|
| 2,542,336 | 2/1951 | Kroger et al. ............... | 252/301.4 F |
| 2,770,749 | 11/1956 | Bril et al. ................ | 252/301.4 F X |
| 3,322,682 | 5/1967 | Thompson ................. | 252/301.4 R |

OTHER PUBLICATIONS

McCauley et al., "Chem. Abstracts", vol. 78, 1973, 142047e.
Borchardt, "J. of Chem. Physics", vol. 42, No. 11, 1965, pp. 3743–3745.

*Primary Examiner*—Jack Cooper
*Attorney, Agent, or Firm*—Norman J. O'Malley; William H. McNeill; Donald R. Castle

[57] ABSTRACT

Phosphors having the general formula $(A_{1-x}RE_x)_2Hf_2O_7$ are disclosed wherein A is selected from the group consisting of yttrium, gadolium, lanthanum, scandium and lutetium; RE is selected from the group consisting of praseodymium, samarium, europium, terbium, dysprosium, holmium, erbium and thulium; and $x$ is from about 0.001 to 0.10. The phosphors are prepared by dissolving an oxide of A and an oxide of RE in a mineral acid and dissolving $HfOCl_2$ in water and combining the two solutions. A precipitating agent such as oxalic acid is added and the precipitate is washed, dried and fired to produce the phosphors.

1 Claim, No Drawings

METHOD OF PREPARING RARE EARTH PYROHAFNATE PHOSPHORS

CROSS-REFERENCE TO RELATED APPLICATION

This application is a divisional of Ser. No. 509,286, filed Sept. 25, 1975, now abandoned and assigned to the assignee of the present invention.

BACKGROUND OF THE INVENTION

This invention relates to novel luminescent compositions and more particularly to such compositions containing lanthanide elements and hafnium. Such luminescent, compositions, known generally as phosphors, emit visible light or other radiation when excited or irradiated by a different form of radiation, such as ultraviolet (U.V.), cathode ray (CR) or X-radiation. CR excitable phosphors are used, for example, in cathode ray tubes while U.V. excitable phosphors are used in fluorescent lamps and mercury lamps and x-ray excitable phosphors are employed in x-ray tubes.

It would be an advance in the art to provide new and useful phosphors for these applications.

OBJECTS AND SUMMARY OF THE INVENTION

Accordingly, it is an object of the invention to provide phosphors excitable by U.V. and CR.

It is another object of the invention to provide a method of making these phosphors.

These objects are accomplished in one aspect of the invention by phosphors having the general formula $(A_{1-x}RE_x)_2Hf_2O_7$ wherein A and RE are selected from the lanthanide elements but are different. The phosphors can be prepared by dissolving oxides of A and RE in a mineral acid. A water soluble hafnium source is dissolved in water and the two solutions are combined. Thereafter, a precipitating agent is added and the precipitate is washed, dried and fired to produce the phosphor. Color emission from red through blue is achieved by these compositions, depending, upon the selection of A and RE. Energization is supplied by U.V. or CR.

DESCRIPTION OF THE PREFERRED EMBODIMENTS

For a better understandng of the present invention, together with other and further objects, advantages and capabilities thereof, reference is made to the following disclosure and appended claims.

Referring now to the invention with greater particularity, the phosphors of the present invention can be represented by the general formula $(A_{1-x}RE_x)_2Hf_2O_7$ wherein A is selected from the group consisting of yttrium, gadolinium, lanthanum, scandium and lutetium; RE is selected from the group consisting of praseodymium, samarium, europium, terbium, dysprosium, holmium, erbium and thulium; and $x$ is from about 0.001 to 0.10.

The preferred method of preparing the phosphors includes the dissolution of appropriate amounts of the oxides of A and RE in a mineral acid, such as hydrochloric, along with a soluble form of hafnium, such as the oxychloride. A mixed lanthanide-hafnium compound is then precipitated by adding a precipitating agent such as oxalic acid. The precipitate is then recovered, dried and fired to the luminescent rare earth activated lathanide-hafnium pyrochlore structured material.

The following examples illustrate the various combinations of materials and the phosphors formed thereby.

Example I 46.0 g $HfOCl_2$
32.0 g $La_2O_3$
0.748 g $Tb_4O_7$

The lanthanide oxides are dissolved in hydrochloric acid and combined with an aqueous solution of the hafnium oxychloride. To this mixed lanthanide-hafnium salf solution is added 65 grams of oxalic acid as a 20% aqueous solution. The coprecipitated mixed oxalates are then water washed to a neutral pH, filtered and oven dried at about 150° C for about 2hours. The dried mixed oxalates are then placed in a suitable container such as a high-density alundum crucible and given a heat treatment at about 950° C for about 2hours. The fired cake is then broken up and blended and refired at about 1480° C for 8hours. The resulting material has the formula $(La_{0.98}Tb_{0.02})_2Hf_2O_7$ and luminesces a bright yellowish-green when excited by U.V. and CR.

The following table illustrates phosphors prepared in the manner of Example I, differing only in starting materials and luminescent properties of the resulting phosphor.

| Example No. | Formula | Lanthanide Oxide Matrix | Grams Activator | Hafnium Oxychloride Grams | Luminescent Properties of Phosphor UV (2537A) Excitation | Cathode-Ray Excitation |
|---|---|---|---|---|---|---|
| II | $(A_{1-x}Tb_x)_2Hf_2O_7$ | $Y_2O_3$ —22.1 $Gd_2O_3$—35.6 | 0.748 | | Yellowish-Green | Yellowish-Green |
| | A=Y,Gd,Lu,Sc x=0.02 | $Lu_2O_3$—39.0 $Sc_2O_3$—13.5 | | 46.0 | | |
| III | $(A_{1-x}Dy_x)_2Hf_2O_7$ | $Y_2O_3$—22.5 $Gd_2O_3$—36.1 | | | Yellow | Yellow |
| | A=Y,La,Gd,Lu,Sc x=0.005 | $Lu_2O_3$—39.6 $Sc_2O_3$—13.7 $La_2O_3$—32.4 | 0.187 | 46.0 | | |
| IV | $(A_{1-x}Eu_x)_2Hf_2O_7$ | $Y_2O_3$—21.8 $Gd_2O_3$—35.0 | | | Orangish-Red | Orangish-Red |
| | A=Y,La,Gd,Lu,Sc x=0.035 | $Lu_2O_3$—38.4 $Sc_2O_3$—13.3 $La_2O_3$—31.5 | 1.23 | 46.0 | | |
| V | $(A_{1-x}Pr_x)_2Hf_2O_7$ | $Y_2O_3$ —22.4 $Gd_2O_3$—35.9 | | | Red | Red |
| | A=Y,La,Gd,Lu,Sc x=0.01 | $Lu_2O_3$—39.4 $Sc_2O_3$—13.7 $La_2O_3$—32.4 | 0.341 | 46.0 | | |
| VI | $(A_{1-x}Sm_x)_2Hf_2O_7$ | $Y_2O_3$—22.1 | | | | |

-continued

| Example No. | Formula | Lanthanide Oxide Grams Matrix | Lanthanide Oxide Grams Activator | Hafnium Oxychloride Grams | Luminescent Properties of Phosphor UV (2537A) Excitation | Luminescent Properties of Phosphor Cathode-Ray Excitation |
|---|---|---|---|---|---|---|
| | A=Y,La,Gd,Lu,Sc x=0.02 | $Gd_2O_3$—35.6 $Lu_2O_3$—39.0 $Sc_2O_3$—13.5 $La_2O_3$—31.9 | 0.698 | 46.0 | Reddish-Orange | Reddish-Orange |
| VII | $(A_{1-x}Ho_x)_2Hf_2O_7$ A=Y,La,Gd,Lu,Sc x=0.01 | $Y_2O_3$—22.4 $Gd_2O_3$—35.9 $Lu_2O_3$—39.4 $Sc_2O_3$—13.7 $La_2O_3$—32.3 | 0.378 | 46.0 | Green | Green |
| VIII | $(A_{1-x}Er_x)_2Hf_2O_7$ A=Y,La,Gd,Lu,Sc x=0.01 | $Y_2O_3$—22.4 $Gd_2O_3$—35.9 $Lu_2O_3$—39.4 $Sc_2O_3$—13.7 $La_2O_3$—32.3 | 0.383 | 46.0 | Green | Green |
| IX | $(A_{1-x}Tm_x)_2Hf_2O_7$ A=Y,La,Gd,Lu,Sc x=0.01 | $Y_2O_3$—22.4 $Gd_2O_3$—35.9 $Lu_2O_3$—39.4 $Sc_2O_3$—13.7 $La_2O_3$—32.3 | 0.386 | 46.0 | Blue | Blue |

In the above phosphors, when either terbium or praseodymium is used as an activator, it is recommended that the phosphor be annealed by firing in pure hydrogen for about 6 hours. This annealing step produces a phosphor having a white body color.

It will be seen from the above that there is herein provided new and novel phosphors having a wide range of color emission.

While there have been shown and described what are at present considered the preferred embodiments of the invention, it will be apparent to those skilled in the art that various changes and modifications can be made herein without departing from the scope of the invention as defined by the appended claims.

What is claimed is:

1. A method of making a luminescent composition of matter having the general formula $(A_{1-x}RE_x)_2Hf_2O_7$ wherein A is selected from the group consisting of yttrium, gadolinium, lanthanum, scandium, and lutetium and RE is selected from the group consisting of praseodymium, samarium, europium, terbium, dysprosium, holmium, erbium, and thulium, and $x$ is from about 0.001 to 0.10, which comprises the steps of: dissolving effective amounts of an oxide of A and an oxide of RE in hydrochloric acid to form a first solution, said effective amounts being sufficient to achieve luminescene in the finished composition; dissolving $HfOCl_2$ in water to form a second solution; combining said first and second solution to form a third solution; adding to said third solution an oxalic acid precipitating agent to form a precipitate; separating said precipitate and washing with water to a neutral pH; filtering and drying said precipitate; first firing said precipitate at a temperature of about 950° C for about 2 hours in a high density alundum crucible; and, mortaring and refiring at about 1480° C for about 8 hours to produce said luminescent composition.

* * * * *

UNITED STATES PATENT AND TRADEMARK OFFICE
CERTIFICATE OF CORRECTION

PATENT NO. : 4,014,812
DATED : March 29, 1977
INVENTOR(S) : PAUL V. KELSEY, JR. and JAMES E. MATHERS It is certified that error appears in the above-identified patent and that said Letters Patent are hereby corrected as shown below:

Col. 2, Line 5   DELETE "$(A_1xRE_x)_2Hf_2O_7$" and
                 INSERT --$(A_{1-x}RE_x)_2Hf_2O_7$--

Col. 2, Line 32  DELETE "salf" and INSERT --salt--

Col. 4, Line 29  DELETE "luminescene" and
                 INSERT --luminescence--

Signed and Sealed this fifth Day of July 1977

[SEAL]

Attest:

RUTH C. MASON
*Attesting Officer*

C. MARSHALL DANN
*Commissioner of Patents and Trademarks*